(12) United States Patent
Ikeda et al.

(10) Patent No.: US 8,098,407 B2
(45) Date of Patent: Jan. 17, 2012

(54) IMAGE FORMING APPARATUS AND CORRECTION OF POSITION SHIFT OF A SCAN LINE IN A SUB-SCAN DIRECTION

(75) Inventors: Atsushi Ikeda, Tokorozawa (JP); Hiroshi Ooya, Machida (JP); Toshiaki Shirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 423 days.

(21) Appl. No.: 12/345,523

(22) Filed: Dec. 29, 2008

(65) Prior Publication Data
US 2009/0174913 A1 Jul. 9, 2009

(30) Foreign Application Priority Data
Jan. 7, 2008 (JP) ................. 2008-000636

(51) Int. Cl.
*H04N 1/407* (2006.01)
(52) U.S. Cl. ........ 358/3.26; 358/1.9; 358/3.13; 358/474; 358/504; 358/505; 347/116; 347/134; 347/135; 347/136
(58) Field of Classification Search .................. None
See application file for complete search history.

(56) References Cited

U.S. PATENT DOCUMENTS

| | | | |
|---|---|---|---|
| 4,937,664 A | 6/1990 | Chiku et al. | 358/75 |
| 6,215,512 B1 | 4/2001 | Imaizumi et al. | 347/234 |
| 6,529,643 B1 | 3/2003 | Loce et al. | 382/300 |
| 7,002,701 B1 | 2/2006 | Nakayasu et al. | 358/1.12 |
| 7,075,561 B2 * | 7/2006 | Ozawa et al. | 347/116 |
| 7,344,217 B2 * | 3/2008 | Kitamura et al. | 347/15 |
| 7,619,775 B2 * | 11/2009 | Kitamura et al. | 358/1.9 |
| 7,630,100 B2 * | 12/2009 | Tojima et al. | 358/3.26 |
| 7,684,079 B2 * | 3/2010 | Takata et al. | 358/1.9 |
| 7,777,923 B2 * | 8/2010 | Kuribayashi | 358/484 |
| 2006/0176354 A1 * | 8/2006 | Yoshida | 347/116 |
| 2006/0256185 A1 | 11/2006 | Suzuki et al. | 347/256 |
| 2006/0290767 A1 * | 12/2006 | Tezuka et al. | 347/115 |
| 2007/0165283 A1 * | 7/2007 | Matsuzaki et al. | 358/3.26 |
| 2009/0213419 A1 * | 8/2009 | Shirai et al. | 358/1.15 |

FOREIGN PATENT DOCUMENTS

| | | |
|---|---|---|
| EP | 1736835 | 12/2006 |
| JP | 2633877 | 4/1997 |
| JP | 2000-253231 | 9/2000 |
| JP | 3388193 | 1/2003 |

OTHER PUBLICATIONS

U.S. Appl. No. 12/371,371, entitled "Image Forming Device, Image Forming Method and Program", filed Feb. 13, 2009 by Toshiaki Shirai, Hiroshi Ooya and Atsushi Ikeda.
Extended European Search Report dated Aug. 23, 2010, from corresponding European Application No. 09150041.3.

* cited by examiner

*Primary Examiner* — King Poon
*Assistant Examiner* — Dung Tran
(74) *Attorney, Agent, or Firm* — Fitzpatrick, Cella, Harper & Scinto (57) ABSTRACT

The invention aims to provide an image forming apparatus digitally correcting curve and inclination of a laser beam. To this end, provided is an image forming apparatus that corrects a position shift of a scan line in a sub-scanning direction.

7 Claims, 8 Drawing Sheets

IMAGE FORMING APPARATUS AND CORRECTION OF POSITION SHIFT OF A SCAN LINE IN A SUB-SCAN DIRECTION

BACKGROUND OF THE INVENTION

1. Field of the Invention

The present invention relates to an electrophotographic image forming apparatus such as a printer or a digital multifunction peripheral, as well as to a control method and program for the image forming apparatus. Specifically, the present invention relates to an image forming apparatus that digitally corrects a curve and inclination of a laser beam without performing a process for optically adjusting a laser scanner unit, as well as to a control method and program for the image forming apparatus.

2. Description of the Related Art

The following method, as disclosed in Japanese Patent No. 2633877, is employed to correct a color shift among color plates in a so-called tandem color image forming apparatus. Specifically, pattern images for registration correction are formed on an intermediate transfer belt, and are read by a sensor. In such a method, a registration error amount of each of the color plates is obtained by reading the pattern images and then is fed back to the image forming processing for the each color plate. Thereby, a color shift among the color plates is corrected.

Meanwhile, a method is known for reducing costs for the electrophotographic image forming apparatus by digitally correcting a curve of a laser beam without performing a process for laser scanner adjustment. For example, such a method is implemented by using a technique disclosed in Japanese Patent No. 3388193.

For example, in the digital correction of a scan line in a sub-scanning direction, an image is formed by appropriately changing from one line to another on the basis of a curve amount of a laser beam acquired in advance, so as to offset the curve amount. The line mentioned here is a set of pixels arranged in a main-scanning direction. In addition, changing from one line to another means that, when an image is to be formed on a certain line, the image is formed by using pixels one line above or below the certain line in the sub-scanning direction, according to the curve amount. Since the curve amount is offset by performing this line change, an image in which the curve is visually corrected can be formed.

To be more specific, when a curve amount of a laser beam from a main-scan position x is expressed as $f(x)$, a line change amount is determined as a number $-y$ acquired from a value $y$ which is obtained by rounding off $f(x)$. Then, all data in sections $xi$ to $xj$ having an equal line change amount is shifted by $-y$ line. When this processing is applied to the entire image region, the curve of the laser beam is offset, and an original image can be thus reproduced.

In the above processing, if $f(x)$ from the main-scan position $x$ is evaluated for each pixel, the digital correction can be performed with very high accuracy. More specifically, firstly, each of pixels in a main-scan direction is sequentially evaluated as to whether or not a one-line shift of the laser beam occurs from the main-scan target position in the sub-scan direction. Then, the processing for the line change is performed based on the evaluation result. In this way, an image that is accurately reproduced from the original image can be formed. However, since such processing requires a bit operation, considerable time is needed to perform the processing, pixel by pixel, on the entire image region by software. In order to reduce the time of the processing it may be necessary to prepare expensive dedicated hardware.

In practice, the curve of a laser beam $f(x)$ from the main-scan position $x$ is usually very small. Specifically, even in an optically-unadjusted laser scanner unit with 600 dpi, the curve $f(x)$ of a scan line in the sub-scanning direction can be approximated to a quadratic curve in the case where the width in the main-scanning direction is 210 mm that is the short side of A4 size paper. It is well possible to manufacture the laser scanner unit so that the height of the curve of a scan line in the sub-scanning direction can be, specifically, less than 1 mm.

In the above case, an effective method is to handle the main-scan position x for every multiple pixels. For example, in the above specific example, even with a laser scanner unit having the largest curve, when the curve $f(x)$ of the scan line is evaluated either on a pixel-by-pixel basis or on a 32-pixel basis, an evaluation error in the sub-scanning direction is about 0.5 line at the maximum for either case. This evaluation error is such a small degree that the evaluation error cannot be visually recognized in an image printed on paper. In this way, the digital correction can be performed by a logical operation for every 16 bits or 32 bits. Accordingly, the processing time for software can be shortened, and the costs for hardware can be reduced.

Further, there is another method for the digital correction. In this method, not only the curve of a laser beam but also a mechanical inclination of the laser beam are digitally corrected by use of a combination of the correction of the color shift among the color plates and the digital correction processing.

In this case, an allowable amount for correction of the color shift among the color plates is usually very similar to an amount of the line change according to inclination components. Therefore, if the pattern images for registration correction are formed with no consideration paid to the inclination components, the pattern images thus formed may exceed the range in which the color shift amount can be measured. Namely, it is supposable that the color shift cannot be corrected.

The correction may be possible by making modifications in the color shift amount measurement and operation processing for the correction. However, the processing per se then may get complicated, and several exceptional processes may also be required. To avoid this, it is desirable that the pattern images for registration correction, too, be subjected to the digital correction including the line change processing in consideration of the curve amount and mechanical inclination amount of a laser beam, and be formed on the intermediate transfer belt or the like.

Here, when a line change is performed in the formation of a pattern image, the pattern image includes a step. Thus, when the pattern images for registration correction are scanned, the measurement of the color shift of each color may include an error. Methods for avoiding this include one disclosed in Japanese Patent Publication No. 2000-253231.

However, depending on a hardware configuration, the method disclosed in Japanese Patent Publication No. 2000-253231 cannot avoid the problem of the color shift measurement error caused by the step.

The above problem might be avoided with the smoothing processing disclosed in Japanese Patent Publication No. 2000-253231 if, for example, the smoothing processing is performed by use of an engine configured of hardware capable of interpolation with a pitch less than one scan line in the sub-scanning direction, and capable of actually printing the interpolated data. However, it is quite expensive to implement such an electrophotographic engine capable of performing interpolation with the pitch less than one scan line in the sub-scanning direction, too, and of printing the interpolated data.

If the smoothing is performed by forming small dots in the main-scanning direction by means of a PWM chip, each dot can be made small in the main-scan direction but not in the sub-scanning direction. Therefore, the line width of one scan line in the sub-scanning direction can be controlled only in a unit of line. For this reason, although the smoothing can visually correct the density, the smoothing cannot solve at all the foregoing problem of the color shift measurement error of less than one line in the sub-scanning direction.

Furthermore, the accuracy for the color shift amount measurement of the pattern images for registration correction, too, may be degraded if the digital correction processing on the main-scan position is performed for every multiple pixels so as to, for example, reduce costs of the hardware, as described above in this section, Description of the Related Art. Accordingly, it is very likely that a shift amount visually unnoticeable becomes a major problem in the processing for the color shift amount measurement which tries to correct a color shift amount of each color with accuracy less than one line.

SUMMARY OF THE INVENTION

The present invention has been made in consideration of the above problem. A processing unit that indicates an operation unit for digital correction processing is changed between a time of digital correction for an image for regular printing and a time of digital correction for pattern images for registration correction. Thereby, the present invention aims to provide an image forming apparatus and a method for controlling the image forming apparatus capable of measuring a color shift amount with high accuracy while maintaining cost performance.

To solve the above problem, the image forming apparatus according to the present invention is an image forming apparatus that corrects a position shift of a scan line in a sub-scanning direction and that includes: first digital correction unit that corrects the position shift of the scan line in the sub-scanning direction in a pixel unit in a first main-scanning direction; second digital correction unit that corrects the position shift of the scan line in the sub-scanning direction in a pixel unit in a second main-scanning direction which is smaller than the pixel unit in the first main-scanning direction; and control unit that performs control such that the first digital correction unit operates at a time of an image formation for regular printing, and that the second digital correction unit operates at a time of a pattern image formation for registration correction for measuring and correcting a color shift.

According to the present invention, a processing unit that indicates an operation unit for digital correction processing is changed between a time of digital correction for an image for regular printing and a time of digital correction for pattern images for registration correction, so that a color shift amount can be measured with high accuracy while maintaining cost performance.

Further features of the present invention will become apparent from the following description of exemplary embodiments with reference to the attached drawings.

DESCRIPTION OF THE EMBODIMENTS

First Embodiment

Figure 1:
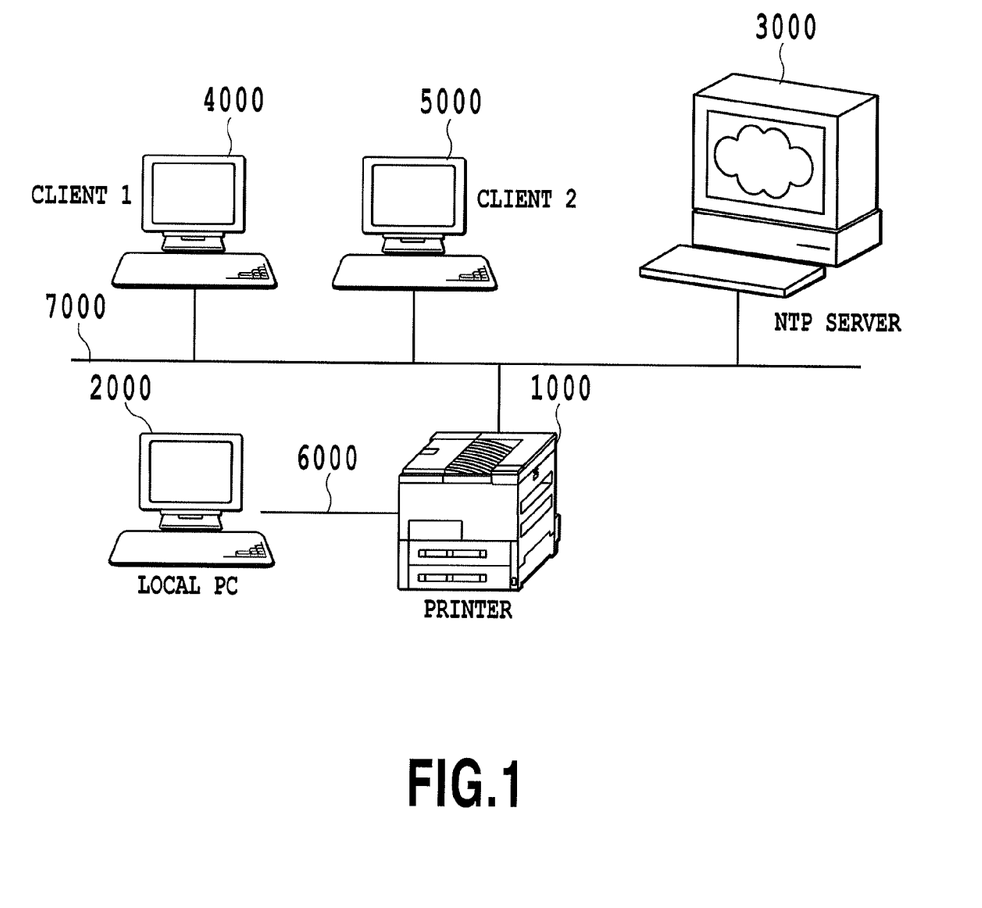
FIG. 1 is a schematic diagram showing an environment for the usage of an image forming apparatus (referred to as a printer below) according to an embodiment of the present invention.

FIG. 1 is a schematic diagram showing an environment for the usage of an image forming apparatus (referred to as a printer below) according to an embodiment of the present invention.

A printer 1000 according to the present embodiment is connected to a local PC 2000 by an USB cable 6000. The printer 1000 has a network connection function and is capable of communicating with an NTP server 3000, a PC 4000 of client 1, a PC 5000 of client 2, and the like through a network 7000.

Figure 2:
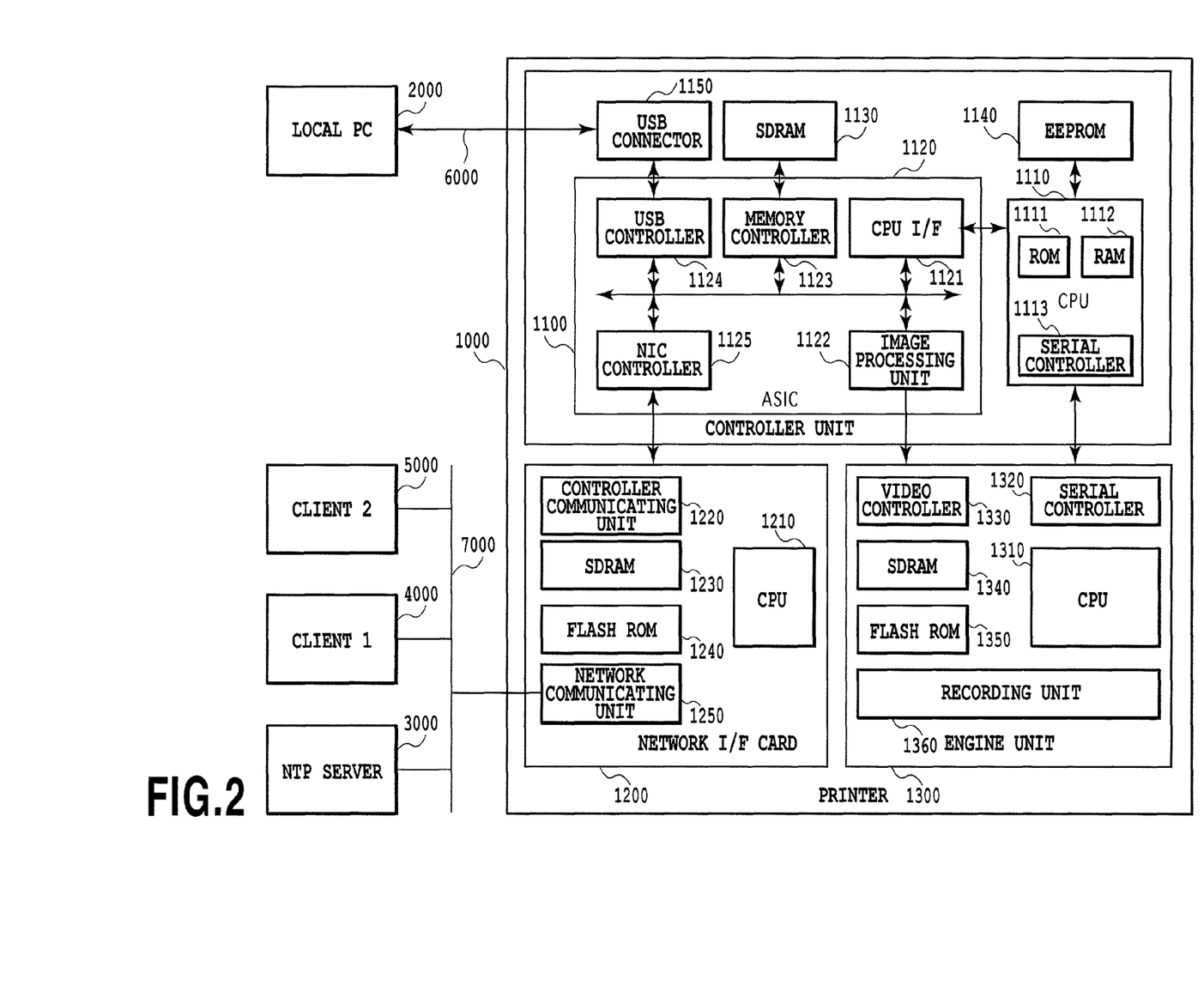
FIG. 2 is a block diagram illustrating a printer 1000 shown in FIG. 1, according to the embodiment of the present invention.

FIG. 2 is a block diagram illustrating the printer 1000 shown in FIG. 1, according to the embodiment of the present invention.

Figure 3:
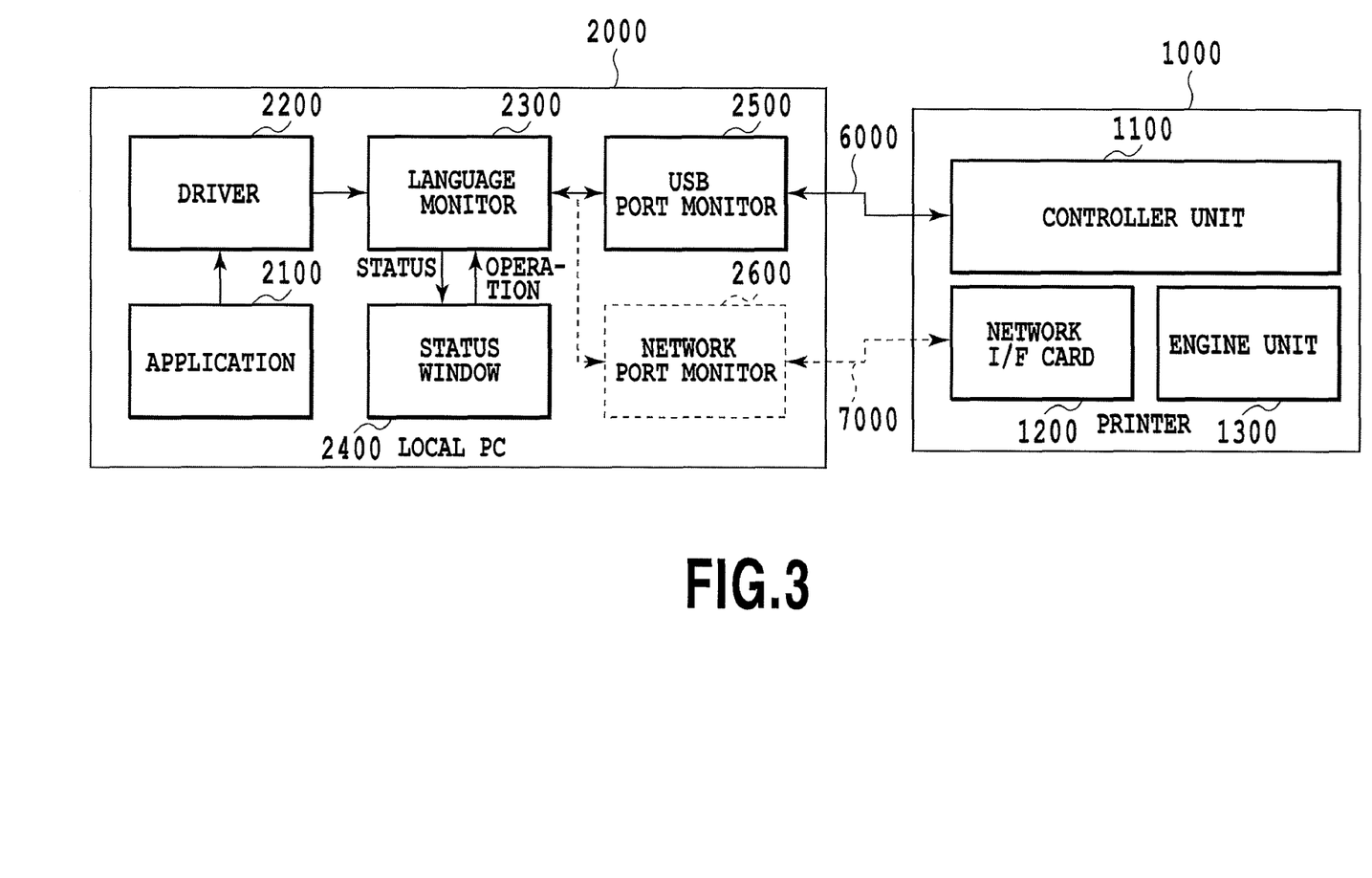
FIG. 3 is a block diagram for illustrating a configuration of software operated on a local PC 2000 or a PC 4000 of client 1 according to the embodiment of the present invention, which are shown in FIG. 1. The local PC 2000 is shown as a representative example.

FIG. 3 is a block diagram for illustrating a configuration of software operated on the local PC 2000 or the PC 4000 of client 1 according to the embodiment of the present invention, which are shown in FIG. 1. In FIG. 3, the local PC 2000 is shown as a representative example.

By using FIGS. 2 and 3, descriptions will be given below of the printer 1000 according to the present embodiment, and of a general flow of its printing operation.

The printer 1000 according to the present invention is mainly constituted of a controller 1100, a network interface card (abbreviated as NIC below) 1200, and an engine unit 1300.

The printer 1000 is designed on the assumption that rendering of a print image and print control are operated on a computer such as the local PC 2000, or on the PC 4000 of client 1 and the PC 5000 of client 2. To be more specific, rendering of a print image and print control are executed by a driver 2200 and a language monitor 2300 shown in FIG. 3. For this reason, the controller 1100 has only a CPU 1110, an ASIC 1120, an SDRAM 1130, an EEPROM 1140, and a USB connector 1150.

The CPU 1110 includes: a ROM 1111 and a RAM 1112 having much less capacity than those used in a printer performing the rendering and the print control by itself; and a serial controller 1113 for serially communicating with the engine unit 1300. The ROM 1111 stores various control programs and various initial values. Meanwhile, the RAM 1112 prepares a work area as well as an area used to store data handled by the controller 1100, except for image data. Since the RAM 1112 is a volatile RAM, limited information, such as various counter values, that needs to be held even after the power is turned off are stored in the EEPROM 1140.

The ASIC 1120 is a package into which a CPU interface (I/F) 1121, an image processing unit 1122, a memory controller 1123, a USB controller 1124, and an NIC controller 1125 are put together. For example, when print processing is executed by an application 2100 on the local PC 2000, the driver 2200 is activated to generate image data to be printed.

Note that, as will be described later, the printer 1000 according to the present embodiment causes the driver 2200 to perform the digital correction processing for a scan line in the sub-scanning direction at the time of the printing by the application 2100.

The generated image data is passed to the language monitor 2300. Based on a predetermined protocol, the language monitor 2300 transfers various commands for controlling the printing and the generated image data to the printer 1000 via the USB port monitor 2500 and the USB cable 6000.

In the printer 1000, the USB controller 1124 receives the transferred commands and data via the USB cable 6000 and the USB connector 1150. The CPU 1110 constantly monitors the state of the USB controller 1124 via the CPU interface (I/F) 1121.

Upon reception of any command, the CPU 1110 executes processing appropriate for the command. If the command requires a response, the CPU 1110 controls the USB controller 1124 via the CPU interface (I/F) 1121 to send response status data for the command back to the local PC 2000. The status thus sent back is passed to the language monitor 2300 via the USB cable 6000 and the USB port monitor 2500. The language monitor 2300 then notifies a status window 2400 of the content of the status. According to the notified status, the status window 2400 displays the printer status or the printing status on a display unit of the local PC 2000, as needed.

Upon receipt of a command to transfer a rendered print image, the CPU 1110 controls the USB controller 1124 and the memory controller 1123 to store image data following the command in the SDRAM 1130.

When a certain amount of image data is stored in the SDRAM 1130, the language monitor 2300 issues a request command to activate the engine unit 1300. Upon recognition of the above command, the CPU 1110 controls the serial controller 1113 to notify the engine unit 1300 of the request for activation. Upon receiving notification via the serial controller 1113 that the engine unit 1300 has been properly activated and that the feeding of paper has been performed properly, the CPU 1110 controls the memory controller 1123 and the image processing unit 1122. Furthermore, the CPU 1110 converts the image data stored in the SDRAM 1130 into a video signal needed by the engine unit 1300 to perform actual printing operations, and then sends the video signal to the engine unit 1300.

The engine 1300 has a CPU 1310, a serial controller 1320, video controller 1330, an SDRAM 1340, a FLASH ROM 1350, and a recording unit 1360. The CPU 1310 controls the entire operations of the engine unit 1300. The video controller 1330 receives the video signal sent from the controller 1100. The SDRAM 1340 has a work area and an area for holding values showing various statuses. The FLASH ROM 1350 stores programs executed by the CPU 1310, various table values referred to by the CPU 1310, and the like. The recording unit 1360 is constituted of a paper feeding system, toner supplying system, a laser beam controlling system, an intermediate transfer system, a fixing unit system, and the like.

Upon receiving a request from the controller 1100 for activation of the recording unit 1360 or for a paper feed, the CPU 1310 controls the recording unit 1360 appropriately, and notifies the controller 1100 of the status as necessary. Once image forming is started, the CPU 1310 controls the video controller 1330 to supply the video signal which is received from the controller 1100 to the recording unit 1360, which is thereby caused to form an image.

Control for forming pattern images for registration correction, which are used for measuring and correcting a color shift, is basically the same as the above-described control performed between the controller 1100 and the engine unit 1300. Instead of the video signal representing an image to be printed, the controller 1110 transfers video signals each representing a pattern image (of cyan, magenta, yellow, and black) for registration correction to the engine unit 1300. As described in the description of the related art, the registration correction is to correct a color shift among the color plates in a tandem color image forming apparatus. By using a sensor prepared in the recording unit 1360 for reading the pattern images for registration correction, the engine unit 1300 detects the edge of each color of the pattern images formed on the intermediate transfer system by the respective video signals. Thereafter, the engine unit 1300 calculates an amount by which each color is shifted from a reference color determined in advance, in the main-scanning direction and in the sub-scanning direction of a main scan line, and then sends the result back to the controller 1100. Among cyan, magenta, yellow, and black, the image forming apparatus according the present embodiment sets black to the reference color. However, choice of the reference color has no direct relation to the nature of the present invention, and any color may be chosen as the reference color.

Note that, as will be described later, the printer 1000 according to the present embodiment causes the language monitor 2300 to perform the digital correction processing for a scan line in the sub-scanning direction when the digital correction is performed on the pattern images for registration correction.

Detail for processing such as the calculation processing for correcting a color shift is similar to that performed in a known electrophotographic engine, and the processing per se has little relation to the nature of the present invention; therefore, a detailed description will be omitted.

The status window 2400 shown in FIG. 3 is capable of receiving an operation request, such as a hold or a cancel of printing, from a user. The operation request thus received is reported to the language monitor 2300 as needed. Based on the predetermined protocol, the language monitor 2300 transfers a command corresponding to the reported operation request to the printer 1000 via the USB port monitor 2500 and the USB cable 6000. The controller 1100 then executes processing corresponding to the command thus transferred.

Meanwhile, the NIC 1200 has a CPU 1210, a controller communication unit 1220, an SDRAM 1230, a FLASH ROM 1240, and network communication unit 1250. The CPU 1210 controls the entire operations of the NIC 1200. The controller communication unit 1220 controls communication with the controller 1100. The SDRAM 1230 has a work area and an area for holding values showing various statuses. The FLASH ROM 1240 stores programs executed by the CPU 1210, various table values referred to by the CPU 1210, and the like. The network communication unit 1250 controls the entire network communication based on TCP/IP.

One of the roles played by the NIC 1200 is to mediate between the controller 1100 and the PC 4000 of client 1, the PC 5000 of client 2, and others. In each client, in addition to the software equivalent to the driver 2200 and the language monitor 2300 on the local PC 2000, a network port monitor 2600 is operated instead of the USB port monitor 2500. Various commands and image data issued by the language monitor 2300 are reported to the NIC 1200 via the network port monitor 2600 and a network 7000. The commands received by the NIC 1200 with the network communication unit 1250 are passed to the controller 1100 by controlling the controller communication unit 1220. The controller 1100 constantly monitors the NIC controller 1125 as it does to the USB controller 1124. As in the case of USB, the controller 1100 processes the received commands and sends status data back to the NIC 1200 via the NIC controller 1125 when necessary. The NIC 1200 controls the network communication unit 1250 to send the status data received by the controller communication unit 1220 back to the client that has issued the command. As in the case of the UBS, the status thus sent back is passed to the status window 2400 via the language monitor 2300, and then is displayed as needed. Transmission and reception of image data is performed in the same manner as the case of USB.

Another role played by the NIC 1200 is to acquire time information by accessing the NTP server 3000 on the basis of NTP known from RFC-1305, and then to report the content of the time information as a command to the controller 1100. An address of the NTP server 3000 can be set in the setting for activation of a web server implemented by the NIC 1200. The address information thus set is stored in the FLASH ROM 1240, and is held even after the power is turned off. Note that the TCP/IP control and the NTP processing are known techniques, and have no direct relation to the nature of the present invention; therefore, a detailed description will be omitted.

Figure 4:
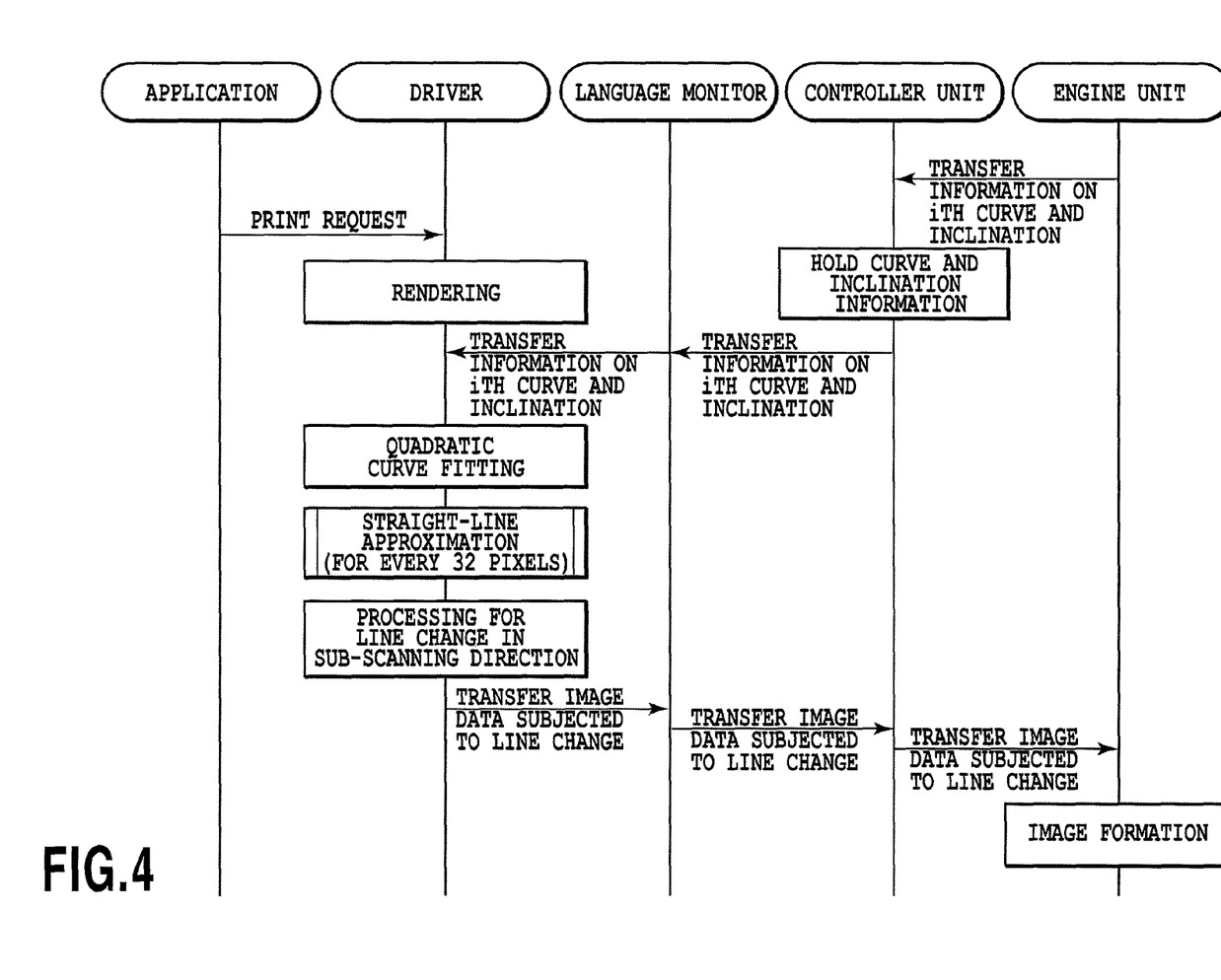
FIG. 4 is a diagram showing a relationship between each block and corresponding processing for digital correction of a scan line in the sub-scanning direction performed at the time of printing executed by an application 2100 shown in FIG. 3.

FIG. 4 is a diagram showing a relationship between each block and corresponding processing for the digital correction of a scan line in the sub-scanning direction performed at the time of regular printing executed by the application 2100 shown in FIG. 3. The regular printing in this case is processing in which, by use of the application 2100, for example, an operator creates an image to be printed and then prints out the created image by activating a printer driver.

The controller 1100 shown in FIG. 3 acquires information from the engine unit 1300 in advance on ith curve and inclination measured at a certain timing i, and caches the acquired information in the RAM 1112 shown in FIG. 2.

Once the user executes printing by using the application 2100 shown in FIG. 3, the driver 2200 is loaded onto the operating system, and a print request is sent by the application 2100 to the driver 2200.

Based on the print request, the driver 2200 executes rendering processing.

Subsequently, via the language monitor 2300, the driver 2200 acquires the information on ith curve and inclination cached in the controller 1100.

Here, it is assumed that the curve and structural inclination of a laser beam in the present embodiment can be fitted to a quadratic curve ($f(x)=ax^2+bx+c$) by using the ith curve and inclination information.

The driver 2200 obtains the quadratic curve by using the ith curve and inclination information, and then performs straight-line approximation.

It is assumed here that the laser scanner unit employed in the present embodiment is manufactured so that the curve and inclination $f(x)$ of a scan line in the sub-scanning direction can be within 1 mm, in the case where a width in a main-scan direction is 210 mm which corresponds to the short side of A4 size paper. In other words, as described in the section, Description of the Related Art, even if the straight-line approximation is performed for every 32 pixels, the error of a scan line in the sub-scanning direction cannot be visually recognized when an image is printed on paper.

Further, as will be described later, the driver 2200 performs line change processing for a scan line in the sub-scanning direction on the basis of the result of the straight-line approximation.

Data obtained after completing the line change processing for a scan line in the sub-scanning direction is transferred from the driver 2200 to the engine unit 1300 via the language monitor 2300 and the controller 1100.

As described in FIGS. 2 and 3, the engine unit 1300 is supplied with the image data, as video signals, subjected to the line change processing, and thereby forms the image data on paper by using the recording unit 1360.

Figure 5:
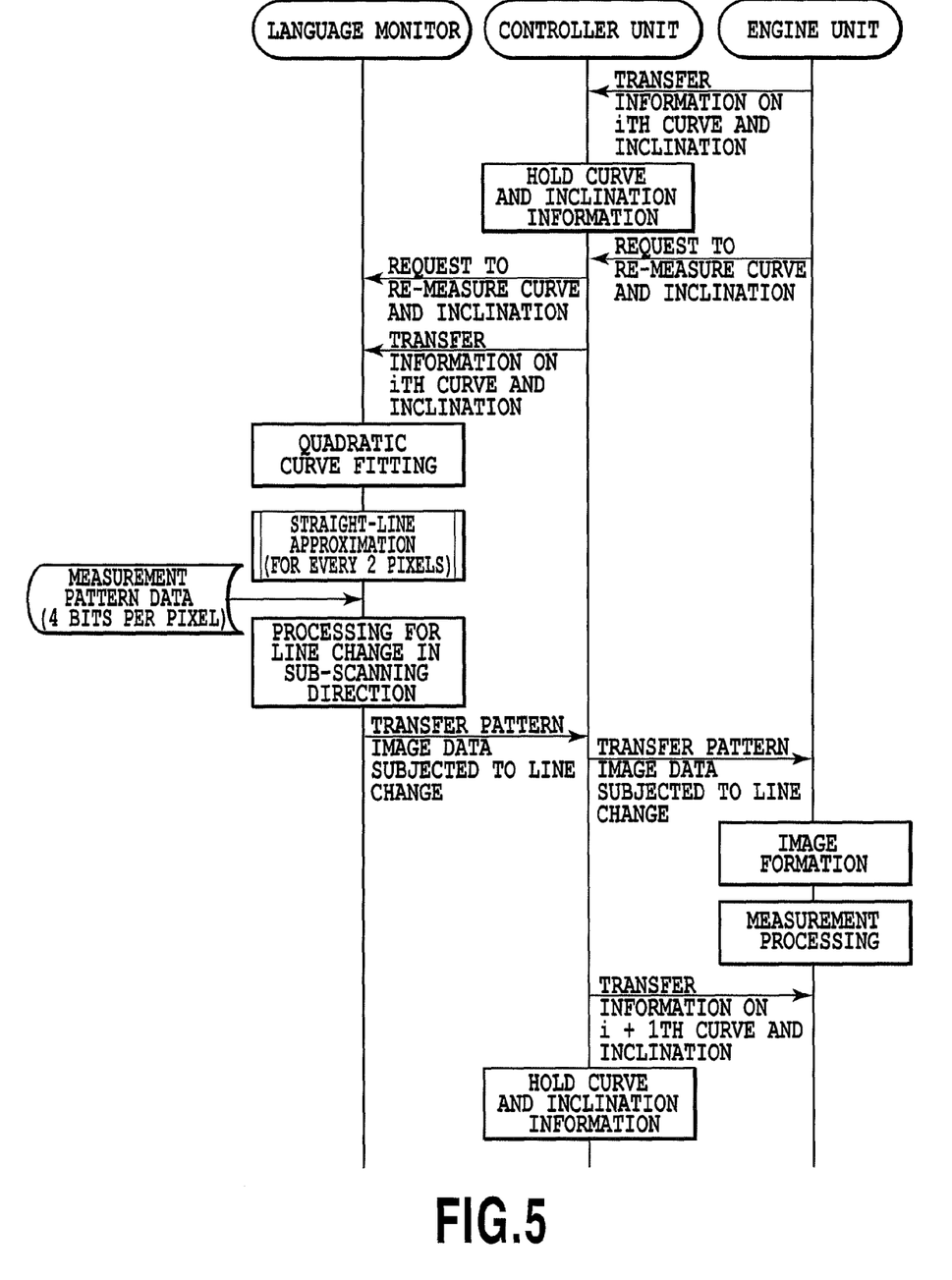
FIG. 5 is a diagram showing a relationship between each block and corresponding processing for the digital correction of a scan line in the sub-scanning direction performed on the pattern images for registration correction.

FIG. 5 is a diagram showing a relationship between each block and corresponding processing for the digital correction of a scan line in the sub-scanning direction performed not for the regular printing but for the pattern images for registration correction.

An example taken here is the digital correction performed after a photosensitive-drum-integrated toner cartridge mounted on the engine unit 1300 is replaced. The processing may of course be performed for every image formation of a predetermined number of sheets (100 sheets, for example).

As described in FIG. 4, the controller 1100 acquires from the engine unit 1300 in advance information on ith curve and inclination measured at a certain timing i, and caches the acquired information in the RAM 1112 shown in FIG. 2.

Once the cartridge is replaced, the engine unit 1300 notifies the language monitor 2300 via the controller 1100 of a request to re-measure the curve and inclination.

Upon receipt of the request for re-measurement, the language monitor 2300 acquires the information on ith curve and inclination cached in the controller 1100.

Then, in the same manner performed by the driver 2200 shown in FIG. 4, the language monitor 2300 performs fitting of the information on ith curve and inclination with respect to the quadratic curve.

The language monitor 2300 further performs the straight-line approximation processing. Here, as will be described later, the straight-line approximation is performed for every 2 pixels, whereas the straight-line approximation by the driver 2200 shown in FIG. 4 is performed for every 32 pixels.

Subsequently, the language monitor 2300 reads prepared original image data of the pattern images for registration correction, and then performs the line change processing for a scan line in the sub-scanning direction on the original image data. Note that the original image data of the pattern images for registration correction has four bits per pixel.

The purpose of performing the straight-line approximation for every two pixels is to avoid bit manipulation performed at the time of the following line change processing for scan lines in the sub-scanning direction. In other words, since the original image data of the pattern images for registration correction is configured to have four bits per pixel, and 4×2=8 bits=1 byte, the line change processing can always be performed in one-byte boundaries. This prevents time needed for the line change processing from being increased by reducing the number of pixels handled at one time. A detail description will be given later of the line change processing for a scan line in the sub-scanning direction.

The original image data of the pattern images on which the line change processing for a scan line in the sub-scanning direction has completed is transferred from the language monitor 2300 to the engine unit 1300 via the controller 1100.

As described in FIGS. 2 and 3, the engine unit 1300 is supplied with the pattern image data subjected to the line change processing, as a video signal, and thereby forms the pattern images on the intermediate transfer system by using the recording unit 1360.

Subsequently, the engine unit 1300 detects the edge of each color of the pattern images, formed on the intermediate transfer system, for registration correction, and then performs calculation to obtain an amount of curve and inclination of each color. Then, the engine unit 1300 sends the obtained information on curve and inclination back to the controller 1100.

The controller 1100 caches the information on curve and inclination thus sent back in the RAM 1112 shown in FIG. 2, as information on i+1th curve and inclination measured at a timing i+1.

Figure 6:
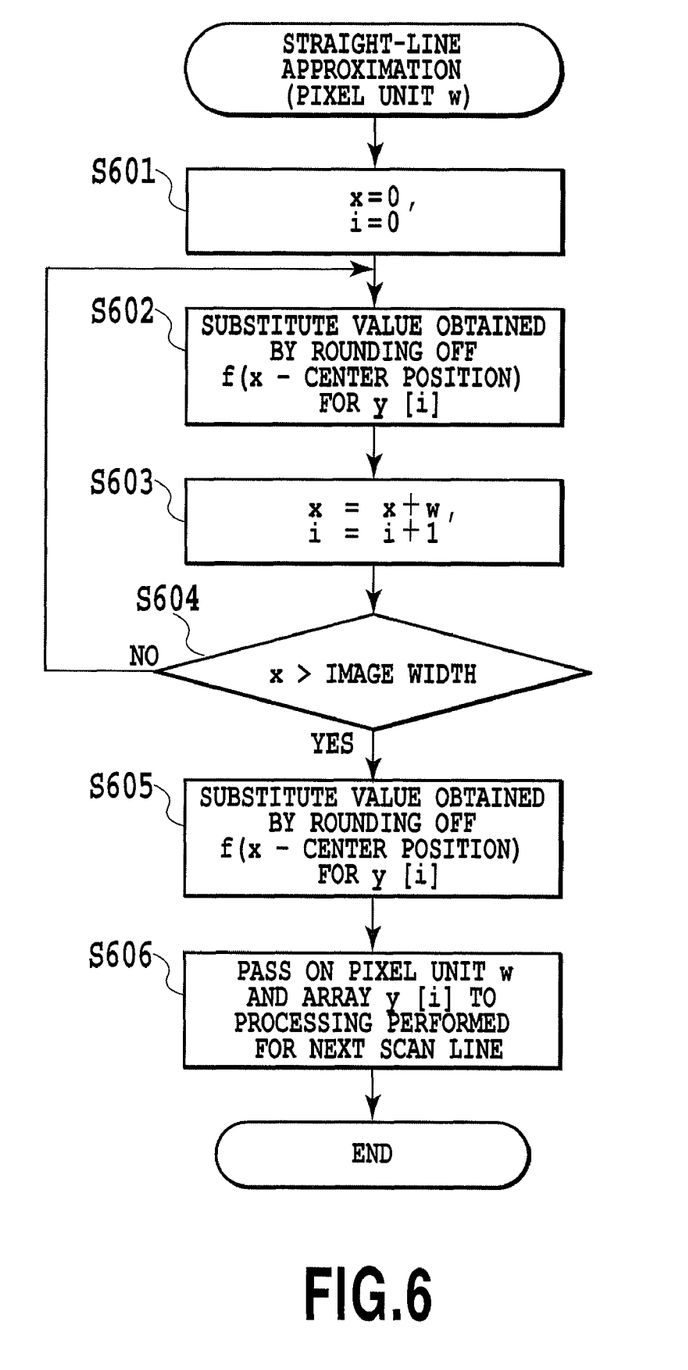
FIG. 6 is a flowchart showing details of the straight-line approximation processing described in FIGS. 4 and 5.

FIG. 6 is a flowchart showing details of the straight-line approximation processing described in FIGS. 4 and 5. The CPU 1110 executes processing for each step in the flowchart shown in FIG. 6. Alternatively, a CPU other than the CPU 1110 may perform the processing for each step in the flowchart shown in FIG. 6.

The straight-line approximation processing is performed by calling a subroutine, and a pixel unit w is received as a parameter from the calling side.

Firstly, in Step S601, a position x in the main-scanning direction and an array index i are initialized.

Then, in Step S602, x—center position is given to the quadratic curve f(x) obtained by the fitting described in FIGS. 4 and 5. A value obtained by rounding off f(x—center position) is substituted into array y [i].

In Step S603, the position x in the main-scanning direction is advanced by the pixel unit w, and the array index i is incremented.

In Step S604, a determination is made on whether or not the position x is outside an image range. If the position x is not outside the image range yet, the processing goes back to repeat Step S602.

If the position x is outside the image range, the processing proceeds to Step S605 to perform the straight-line approximation processing for ends of the image.

Finally, in Step S606, the CPU 1110 prepares to pass on the pixel unit w and the array y [i] to the following line change processing for scan lines in the sub-scanning direction. Then, the straight-line approximation processing is completed.

Figure 7:
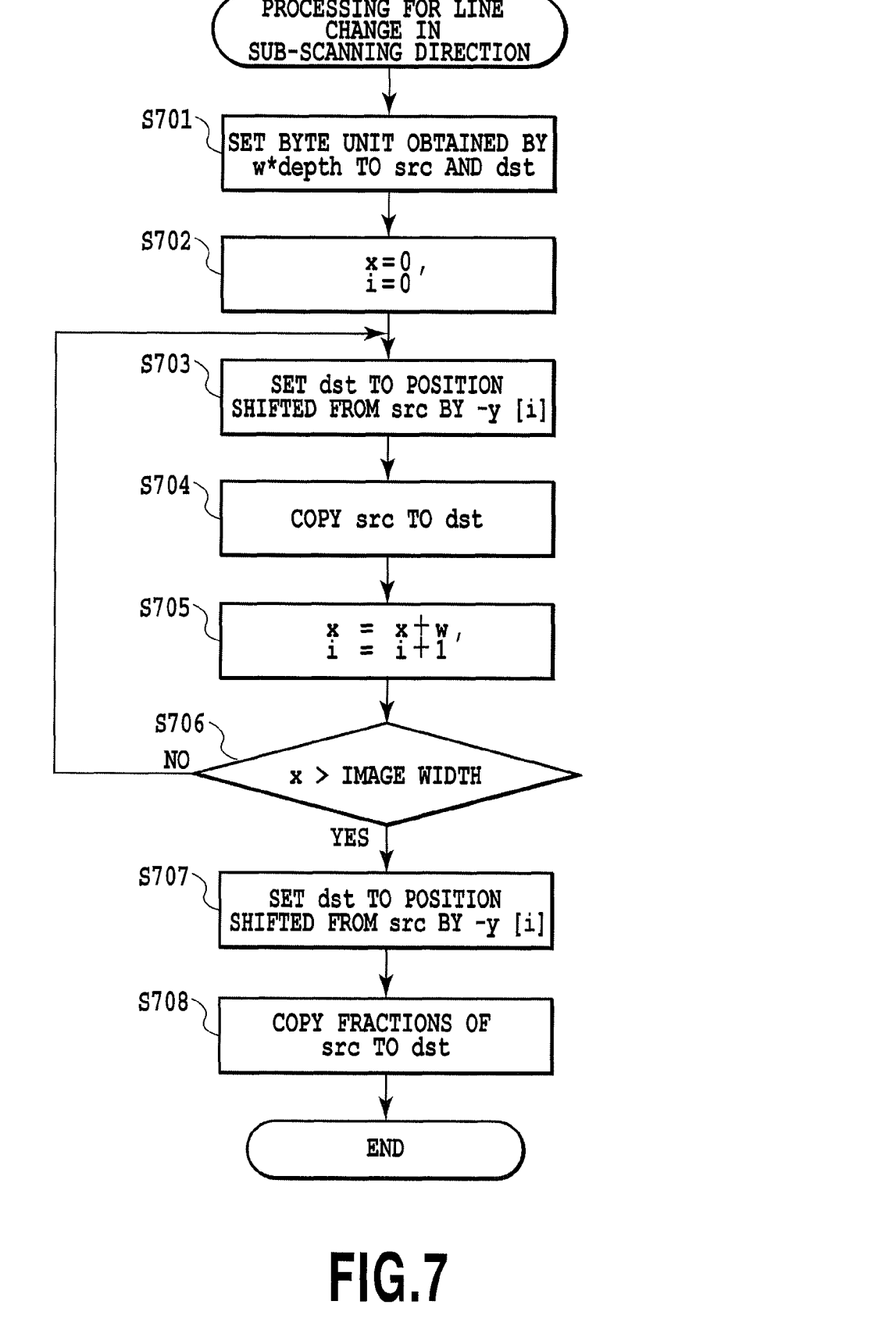
FIG. 7 is a flowchart showing details of line change processing for a scan line in the sub-scanning direction, described in FIGS. 4 and 5.

FIG. 7 is a flowchart showing details of the line change processing for a scan line in the sub-scanning direction, described in FIGS. 4 and 5. The CPU 1110 executes processing for each step in the flowchart shown in FIG. 7. Alternatively, a CPU other than the CPU 1110 may perform the processing for each step in the flowchart shown in FIG. 7.

Firstly, in Step S701, the CPU 1110 determines a processing unit for src and dst on the basis of the pixel unit w passed on from Step S606 in FIG. 6 and of a bit number (depth) per pixel of the image data. For example, if w=32 and depth=2, the processing unit is 8 bytes.

Next, in Step S702, the position x in the main-scanning direction and the array index i are initialized.

Then, in Step S703, dst is set to a position that aligns with the position of src in the main-scanning direction and that is shifted from the position of src by −y[i] line of a scan line in the sub-scanning direction.

Subsequently, in Step S704, the content of the position of src is copied to the position of dst by the amount of the processing unit. Here, for example, data size handled at one time is appropriately adjusted according to the processing unit, so that the copying can be performed as fast as possible.

Then, in Step S705, the position x in the main-scanning direction is advanced by the pixel unit w, and the array index i is incremented.

In Step S706, a determination is made on whether or not the position x is outside the image range. If the position x is not outside the image range yet, the processing goes back to repeat Step S703.

If the position x is outside the image range, the processing proceeds to Step S707 to set a position of dst with respect to the position of src in the same manner as in Step S703.

Further, in Step S708, the copying is performed for fractions discarded by rounding-off, thereby completing the processing for changing the position of src of a scan line in the sub-scanning direction for one line.

In the line change processing for a scan line in the sub-scanning direction shown in FIGS. 4 and 5, processing shown in FIG. 7 is repeatedly executed to perform processing on all src lines.

Figure 8:
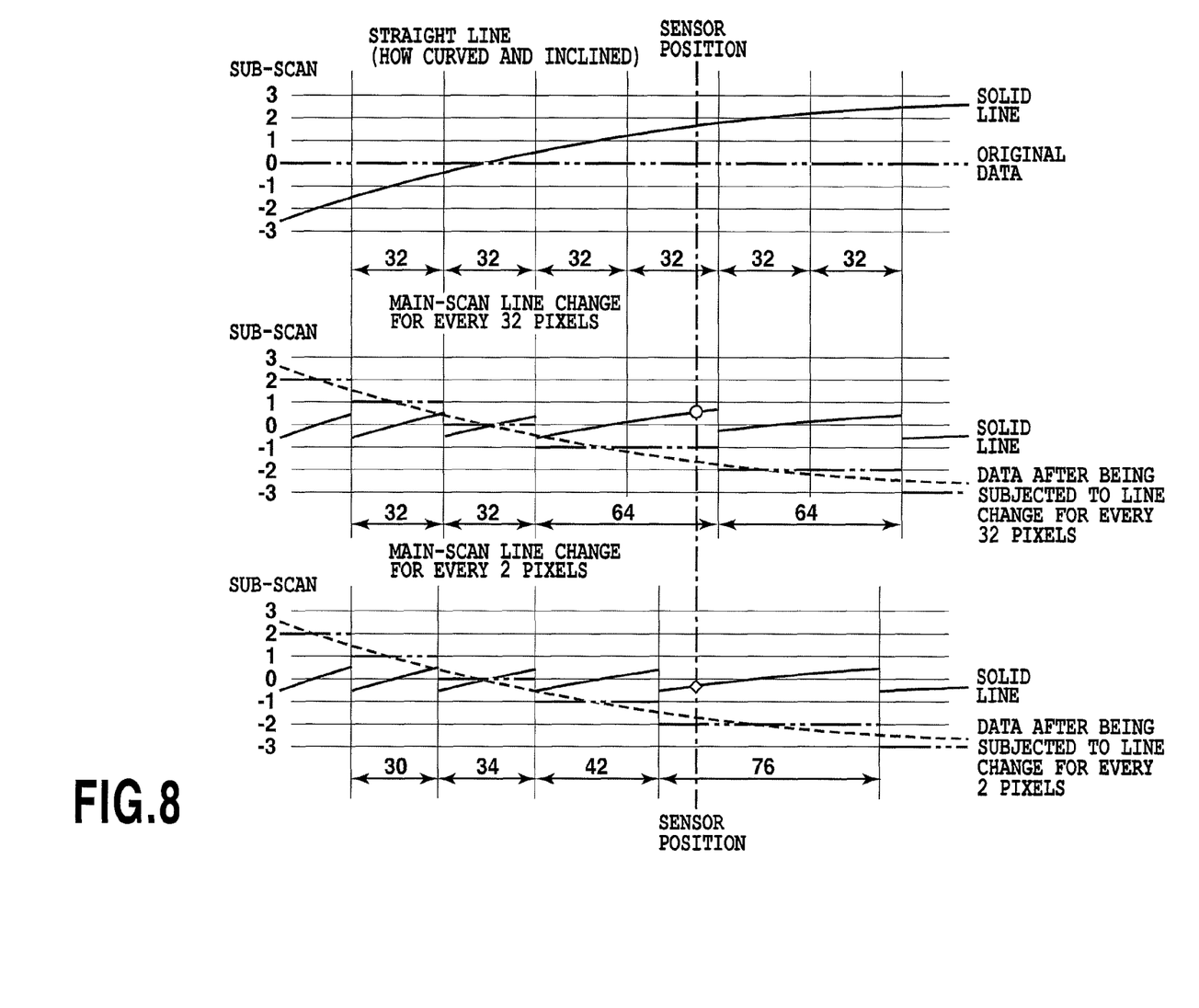
FIG. 8 is a diagram showing an example of the difference between the line change processing performed for every 32 pixels and that performed for every 2 pixels.

FIG. 8 is a diagram showing an image after execution of the processing shown in FIGS. 6 and 7. FIG. 8 also shows an example of the difference between the line change processing performed for every 32 pixels and that performed for every 2 pixels.

The top view of FIG. 8 shows how the straight two-dot chain line is reproduced as the solid line when an image is formed by the engine unit 1300 without any correction. In other words, the solid line exactly represents the curve and inclination of a laser beam.

The middle view of FIG. 8 shows an example of performing the straight-line approximation processing and the line change processing for a scan line in the sub-scanning direction for every 32 pixels. The straight two-dot chain line shown in the middle view of FIG. 8 is obtained by performing the straight-line approximation processing for every 32 pixels, and by performing the line change processing on the two-dot chain line shown in the top view of FIG. 8 on the basis of the result of the straight-line approximation. As can be seen from FIG. 8, there is a change in widths in the main-scanning direction for which the line change processing is performed between the cases of performing the process for every 32 pixels and for every 2 pixels. Specifically, the widths are 32, 32, 64, and 64 in order from the left when the pixel unit is 32, whereas the widths are 30, 34, 42, and 76 when the pixel unit is 2. When formed into an image by the engine unit 1300, the straight line looks like the solid line. As can be seen, the solid line stays in a range within ±1 line.

The bottom view of FIG. 8 shows an example of performing the straight-line approximation processing and the line change processing for a scan line in the sub-scanning direction for every 2 pixels. In the way similar to the example shown in the middle view of FIG. 8, the straight two-dot chain line shown in the bottom view of FIG. 8 is obtained by performing the straight-line approximation processing for every 2 pixels, and by performing the line change processing on the two-dot chain line shown in the top view of FIG. 8 on the basis of the result of the straight-line approximation. When formed into an image by the engine unit 1300, the straight line looks like the solid line. As can be seen, the shift of the solid line stays in a range of ±0.5 line with a resolution of 600 dpi, which is an almost ideal.

Assume here that a sensor for reading the pattern images for registration correction is arranged at a position shown in the figure. The solid line is detected at a position marked by a symbol "○" in the middle view of FIG. 8 and at a position marked by a symbol "◊" in the bottom view of FIG. 8. The difference between these detected positions corresponds exactly to one line. In other words, there may be one line of error between a color shift measured by the processing for every 32 pixels and a color shift measured by the processing for every 2 pixels, and more ideal correction can be accomplished by performing the processing for every 2 pixels.

Other Embodiment

In the first embodiment, the present invention has been described by using an example of a so-called host-based printing system in which an information processing terminal such as the local PC 2000 executes the rendering of a print image and the print control. However, the present invention is not limited to the host-based printing system. Specifically, the present invention may also be applied to an image forming apparatus that performs printing by receiving a command written in a page description language from the information processing terminal, and by rendering a print image on the basis of the command.

Moreover, a description has been given in the first embodiment that, in the case of the printing executed by an application, 32 pixels is the main-scan unit used for the straight-line approximation and the line change processing for a scan line in the sub-scanning direction. However, the unit need not be 32 pixels. For example, the unit may be 64 pixels if the laser scanner unit can be manufactured so that the curve and structural inclination components may be less than 500 μm. An influence of processing by the 64 pixel unit on a result of printing on paper is similar to the case of the first embodiment.

In addition, a description has been given in the first embodiment that, in the case of the formation of the image patterns for registration correction, 2 pixels is the main-scan unit used for the straight-line approximation and the line change processing for a scan line in the sub-scanning direction. As explained in the first embodiment, the original image data of the pattern images for registration correction is configured to have four bits per pixel, and the processing is performed for every 2 bits so that the line change processing can always be performed for every 1 byte since 4×2=8 bits=1 byte. However, configuring the original image data of the pattern images to have 4 bits per pixel has no direct relation to the nature of the present invention. Similarly, the main-scan unit used for the straight-line approximation and the line change processing for a scan line in the sub-scanning direction need not be 2 pixels. The digital correction processing in the sub-scanning direction for scan lines of the pattern images does not require performance as high as the printing. Accordingly, a color-shift amount can be measured more accurately by performing the processing every one pixel.

Further, in the first embodiment, a description has been given on the assumption that the curve and structural inclination components of the laser scanner unit can be fitted to the quadratic curve f(x). However, the present invention is applicable even when the curve and structural inclination components of the laser scanner unit are not fitted to the quadratic curve. As an example, consider a case where there are only inclination components and no curve components, namely, f(x)=ax+b. Even in such a case, effects of the present invention can be sufficiently obtained by the straight-line approximation described in FIG. 6, and by the line change processing for a scan line in the sub-scanning direction described in FIG. 7.

Note that in the present invention, the main-scanning direction may be called a "first main-scanning direction" and a "second scanning direction" to make a distinction.

Further, in the present invention, the digital correction may be called a "first digital correction" and a "second digital correction" to make a distinction.

Other Embodiments

Furthermore, the present invention is applicable to a system configured of multiple devices (such as, for example, a computer (information processing device), an interface device, a reader, and a printer), as well as to a device (such as a compound machine, a printer, and a facsimile) configured of a single device.

An object of the present invention is accomplished also when a computer (otherwise, CPU or MPU) of the system or of the device reads a program code from a recording medium to execute the program code. Here, the program code is for executing each procedure shown in the flowcharts described in the above embodiment. In such a case, the program code thus read from the recording medium is the one executing the functions of the above embodiment. For this reason, the program code and the computer-readable recording medium in which the program code is stored and recorded configure one of the aspects of the present invention.

Usable as the recording medium for supplying the program code are, for example, a floppy (registered trademark) disk, a hard disk, an optical disk, a magneto-optical disk, a CD-ROM, a CD-R, a magnetic tape, a non-volatile memory card, and a ROM.

In addition, the above-described functions of the embodiment are implemented by a computer executing a program having been read. The execution of the program includes a case where an operating system operating on the computer or the like performs part of or all of the actual processing, according to an instruction of the program.

Furthermore, the above-described functions of the embodiment can also be implemented by a function expansion board inserted into the computer, or by a function expansion unit connected to the computer. In such a case, firstly, a program code read from a recording medium is written onto a memory device included in the function expansion board inserted into the computer, or in the function expansion unit connected to the computer. Thereafter, a CPU or the like included in the function expansion board or in the function expansion unit performs part of or all of the actual processing, according to an instruction of the program. The above-described functions of the embodiment are implemented by the processing performed by the function expansion board or by the function expansion unit.

Although several embodiments have been described above, the present invention is not limited to the above embodiments. The present invention can be modified in various ways (including articulate combinations of the embodiments) on the bases of the spirit of the present invention. The modifications should not be excluded from the scope of the present invention.

The present invention has been described by showing various examples and embodiments. However, it should be apparent to those skilled in the art that the spirit and scope of the present invention are not to be limited to the specific descriptions given in the present description.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-000636, filed Jan. 7, 2008, which is hereby incorporated by reference herein in its entirety.

What is claimed is:

1. An image forming apparatus that corrects a position shift of a scan line in a sub-scanning direction, comprising:
 a digital correction unit configured to perform a straight-line approximation processing, so as to correct the position shift of the scan line in the sub-scanning direction, in a pixel unit w in a main-scanning direction; and
 a control unit configured to perform control such that the pixel unit w is set to a first number of pixels and the straight-line approximation in the set pixel unit w is performed at a time of an image formation for regular printing, and to perform control such that the pixel unit w is set to a second number of pixels smaller than the first number and the straight-line approximation in the set pixel unit w is performed at a time of a pattern image formation for registration correction for measuring and correcting a color shift, the color shift being measured from the pattern image.

2. A method for controlling an image forming apparatus that corrects a position shift of a scan line in a sub-scanning direction, the method comprising:
 a digital correction step of performing a straight-line approximation processing, for correcting the position shift of the scan line in the sub-scanning direction, in a pixel unit w in a main-scanning direction; and
 a control step of performing control such that the pixel unit w is set to a first number of pixels and the straight-line approximation in the set pixel unit w is performed at a time of an image formation for regular printing, and such that the pixel unit w is set to a second number of pixels smaller than the first number and the straight-line approximation in the set pixel unit w is performed at a time of a pattern image formation for registration correction for measuring and correcting a color shift, the color shift being measured from the pattern image.

3. The image forming apparatus according to claim 1, further comprising a computer, wherein the correction of position shift is implemented by software processed by the computer.

4. The image forming apparatus according to claim 1, wherein the correction of position shift includes: a fitting to a quadratic curve by using curve and inclination information; and the straight-line approximation in the pixel unit in the main-scanning direction.

5. The image forming apparatus according to claim 1, wherein the registration correction corrects a shift of each of color plates other than a black plate with respect to the black plate, the shift being formed by the image forming apparatus.

6. The image forming apparatus according to claim 1, wherein the correction of position shift corrects a shift of 0.5 line or less with the second number of pixels set for the pixel unit w when an image is formed with a resolution of 600 dpi.

7. A non-transitory computer-readable recording medium on which is stored a program for causing a computer to execute a control method which comprises:
 a digital correction step of performing a straight-line approximation processing, for correcting a position shift of a scan line in a sub-scanning direction, in a pixel w unit in a main-scanning direction; and
 a control step of performing control such that the pixel unit w is set to a first number of pixels and the straight-line approximation in the set pixel unit w is performed at a time of an image formation for regular printing, and such that the pixel unit w is set to a second number of pixels smaller than the first number and the straight-line approximation in the set pixel unit w is performed at a time of a pattern image formation for registration correction for measuring and correcting a color shift, the color shift being measured from the pattern image.

* * * * *